United States Patent
Zhang et al.

(10) Patent No.: US 12,022,374 B2
(45) Date of Patent: Jun. 25, 2024

(54) TRANSMISSION PATH SELECTION METHOD, INFORMATION CONFIGURATION METHOD, TERMINAL, AND NETWORK DEVICE

(71) Applicant: VIVO MOBILE COMMUNICATION CO., LTD., Guangdong (CN)

(72) Inventors: Yanxia Zhang, Chang'an Dongguan (CN); Yumin Wu, Chang'an Dongguan (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 250 days.

(21) Appl. No.: 17/486,697

(22) Filed: Sep. 27, 2021

(65) Prior Publication Data

US 2022/0015002 A1    Jan. 13, 2022

Related U.S. Application Data

(63) Continuation of application No. PCT/CN2020/079878, filed on Mar. 18, 2020.

(30) Foreign Application Priority Data

Mar. 28, 2019    (CN) .......................... 201910245762.0

(51) Int. Cl.
*H04W 40/12*    (2009.01)
*H04W 24/08*    (2009.01)

(52) U.S. Cl.
CPC ........... *H04W 40/12* (2013.01); *H04W 24/08* (2013.01)

(58) Field of Classification Search
None
See application file for complete search history.

(56) References Cited

U.S. PATENT DOCUMENTS

| | | | |
|---|---|---|---|
| 6,173,162 B1 * | 1/2001 | Dahlman | H04B 7/2628 455/69 |
| 2011/0040888 A1 | 2/2011 | Krishnaswamy et al. | |
| 2014/0092887 A1 | 4/2014 | Guo et al. | |
| 2015/0271818 A1 | 9/2015 | Tavildar et al. | |

(Continued)

FOREIGN PATENT DOCUMENTS

| | | |
|---|---|---|
| CN | 102474891 A | 5/2012 |
| CN | 108737045 A | 11/2018 |

(Continued)

OTHER PUBLICATIONS

CN Office Action in Application No. 201910245762.0 dated Jul. 28, 2021.

(Continued)

*Primary Examiner* — Otis L Thompson, Jr.
(74) *Attorney, Agent, or Firm* — Brooks Kushman P.C.

(57) ABSTRACT

A transmission path selection method, an information configuration method, a terminal, and a network device are provided, and related to the field of communications technologies. The transmission path selection method is applied to a terminal and includes: obtaining configuration information for selecting a transmission path by the terminal, where a radio bearer of the terminal corresponds to at least two transmission paths; and selecting a transmission path from the at least two transmission paths based on the configuration information.

14 Claims, 5 Drawing Sheets

(56) References Cited

U.S. PATENT DOCUMENTS

| | | | |
|---|---|---|---|
| 2018/0337846 A1* | 11/2018 | Lee | H04W 28/082 |
| 2018/0343701 A1* | 11/2018 | Ma | H04W 76/10 |
| 2018/0367288 A1 | 12/2018 | Vrzic et al. | |
| 2019/0327623 A1* | 10/2019 | Liu | H04L 45/24 |
| 2019/0394796 A1* | 12/2019 | Wei | H04W 72/21 |
| 2020/0052826 A1 | 2/2020 | Han et al. | |
| 2020/0137673 A1* | 4/2020 | Shikari | H04W 28/24 |
| 2020/0187040 A1* | 6/2020 | Tsai | H04W 24/10 |
| 2020/0267753 A1* | 8/2020 | Adjakple | H04W 72/54 |
| 2020/0296588 A1* | 9/2020 | Yang | H04W 76/27 |
| 2023/0027953 A1* | 1/2023 | Palle Venkata | H04W 48/12 |

FOREIGN PATENT DOCUMENTS

| | | |
|---|---|---|
| CN | 108811117 A | 11/2018 |
| CN | 109151944 A | 1/2019 |
| EP | 2 683 199 A1 | 1/2014 |
| WO | 2018192552 A1 | 10/2018 |

OTHER PUBLICATIONS

"RLC behaviors upon duplicate deactivation" Huawei, HiSilcon, 3GPP TSG RAN WG2 #100 Meeting, R2-1712735, Nov. 27, 2017.
"Status Report to TSG" 3GPP TSG RAN meeting #77, RP-171783, Sep. 11, 2017.
Written Opinion and International Search Report in Application No. PCT/CN2020/079878 dated Oct. 7, 2021.
Search Report in EP Application No. 20779022.1 dated Apr. 14, 2022.
"Further aspects of data duplication in PDCP layer" 3GPP TSG-RAN WG2 #97, Ericsson, Tdoc R2-1700834, Feb. 13, 2017.

\* cited by examiner

TRANSMISSION PATH SELECTION METHOD, INFORMATION CONFIGURATION METHOD, TERMINAL, AND NETWORK DEVICE

CROSS-REFERENCE TO RELATED APPLICATIONS

This application is continuation application of PCT International Application No. PCT/CN2020/079878 filed on Mar. 18, 2020, which claims priority to Chinese Patent Application No. 201910245762.0, filed in China on Mar. 28, 2019, the disclosures of which are incorporated herein by reference in their entireties.

TECHNICAL FIELD

This disclosure relates to the field of communications technologies, and in particular, to a transmission path selection method, an information configuration method, a terminal, and a network device.

BACKGROUND

In a related technology, when a data duplication function is configured for a radio bearer (RB), an initial activation state is also indicated, and activation or deactivation of the data duplication function may be subsequently controlled by using medium access control control element (MAC CE) signaling, to change a transmission path available for the radio bearer.

In the R16, a multiple leg data duplication function is introduced. To more quickly change a transmission path available for a radio bearer to adapt to a dynamically changing channel condition, a method for selecting a transmission path by a terminal or user equipment (UE) itself is introduced, and a network side does not need to transmit control signaling for changing a transmission path. No relevant detailed solution is yet available for the method for selecting a transmission path by UE itself.

SUMMARY

Embodiments of this disclosure provide a transmission path selection method, an information configuration method, a terminal, and a network device.

The following solutions are used in this disclosure:

According to a first aspect, some embodiments of this disclosure provide a transmission path selection method, applied to a terminal and including:
  obtaining configuration information for selecting a transmission path by the terminal, where a radio bearer of the terminal corresponds to at least two transmission paths; and
  selecting a transmission path from the at least two transmission paths based on the configuration information.

According to a second aspect, some embodiments of this disclosure provide an information configuration method, applied to a network device and including:
  transmitting configuration information to a terminal, where the configuration information causes the terminal to select a transmission path from at least two transmission paths, and the at least two transmission paths are at least two transmission paths corresponding to a radio bearer of the terminal.

According to a third aspect, some embodiments of this disclosure provide a terminal, including:
  a transceiver module, configured to obtain configuration information for selecting a transmission path by the terminal, where a radio bearer of the terminal corresponds to at least two transmission paths; and
  a processing module, configured to select a transmission path from the at least two transmission paths based on the configuration information.

According to a fourth aspect, some embodiments of this disclosure provide a network device, including:
  a transmitting module, configured to transmit configuration information to a terminal, where the configuration information causes the terminal to select a transmission path from at least two transmission paths, and the at least two transmission paths are at least two transmission paths corresponding to a radio bearer of the terminal.

According to a fifth aspect, some embodiments of this disclosure provide a communications device, including a memory, a processor, and a program stored in the memory and capable of running on the processor, where when the program is executed by the processor, the steps of the foregoing transmission path selection method or information configuration method are implemented.

According to a sixth aspect, some embodiments of this disclosure provide a computer-readable storage medium, where the computer-readable storage medium stores a computer program, and when the computer program is executed by a processor, the steps of the foregoing transmission path selection method or the steps of the foregoing information configuration method are implemented.

DESCRIPTION OF EMBODIMENTS

To make the objectives, technical solutions, and advantages of this disclosure clearer, the following describes this disclosure in detail with reference to the accompanying drawings and specific embodiments.

Some concepts used in the description of the embodiments of this disclosure are explained first.

1. Transmission Through Packet Data Convergence Protocol (PDCP) Duplication (Namely, PDCP Duplication)

The PDCP duplication function is introduced to new radio (NR) to improve reliability of data transmission. A network side configures whether a PDCP layer corresponding to a radio bearer (RB) of user equipment (UE, also referred to as a terminal) transmits, after data of a PDCP entity is duplicated, the duplicated data through two different paths (for example, two different radio link control (RLC) entities). Different RLC entities correspond to different logical channels.

The PDCP duplication function may indicate whether it is to be enabled (that is, activated) or disabled (that is, deactivated) through medium access control control element (MAC CE) signaling. When configuring the PDCP duplication function of the RB, the network side may configure whether the function is enabled immediately upon configuration, without no MAC CE signaling required for additional activation.

2. Bearer Types of the PDCP Duplication Function

Figure 1:
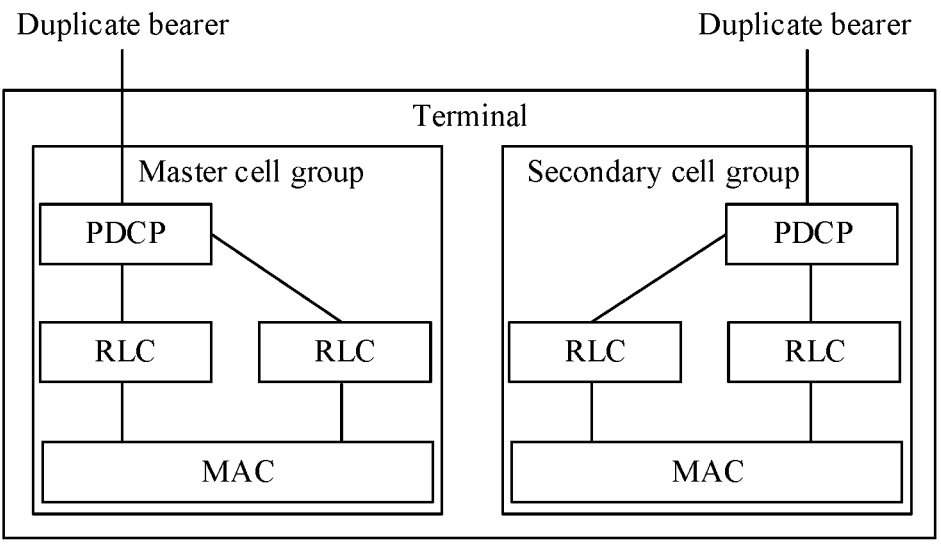
FIG. 1 is a schematic diagram of a bearer type of a PDCP duplication function.
Figure 2:
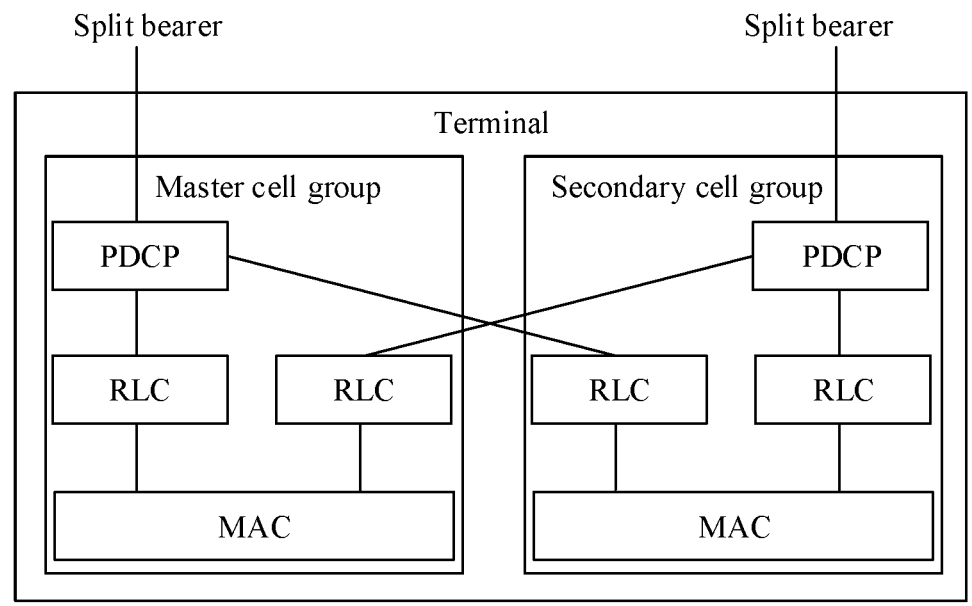
FIG. 2 is another schematic diagram of a bearer type of a PDCP duplication function.

In a 5G system, due to a dual connectivity (DC) architecture that includes two cell groups, namely, a master cell group (MCG) and a secondary cell group (SCG), the PDCP duplication function is specific to two bearer types shown in FIG. 1 and FIG. 2:

A11. Split bearer: A PDCP entity corresponding to the bearer is in one cell group, and two (or more) RLC entities and two (or more) MAC entities that correspond to the bearer are in a different cell group.

A12. Duplicate bearer: One PDCP entity, two (or more) RLC entities, and one MAC entity that correspond to the bearer are in one cell group.

An MCG corresponds to an MCG MAC entity, and an SCG corresponds to an SCG MAC entity.

A network entity corresponding to the MCG is a master node (MN), and a network entity corresponding to the SCG is a secondary node (SN).

3. Multiple Leg PDCP Duplication

Figure 3:
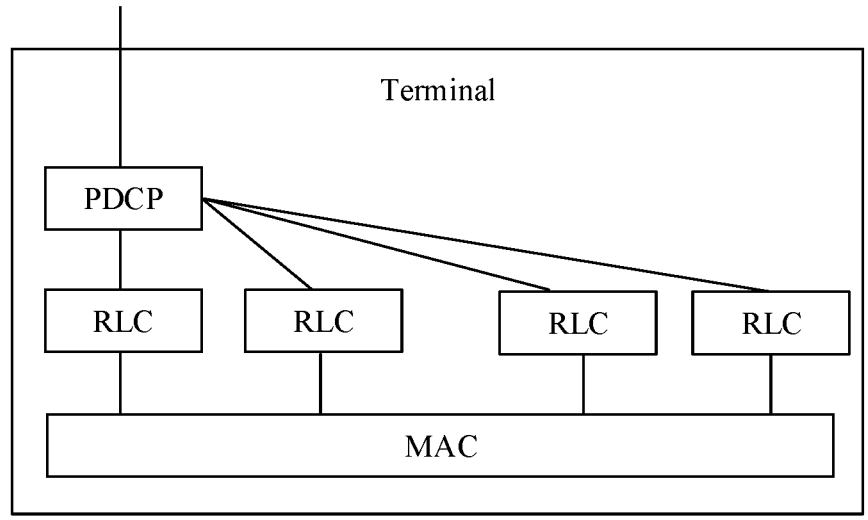
FIG. 3 is a schematic diagram of a bearer type of a multiple leg PDCP duplication function.
Figure 4:
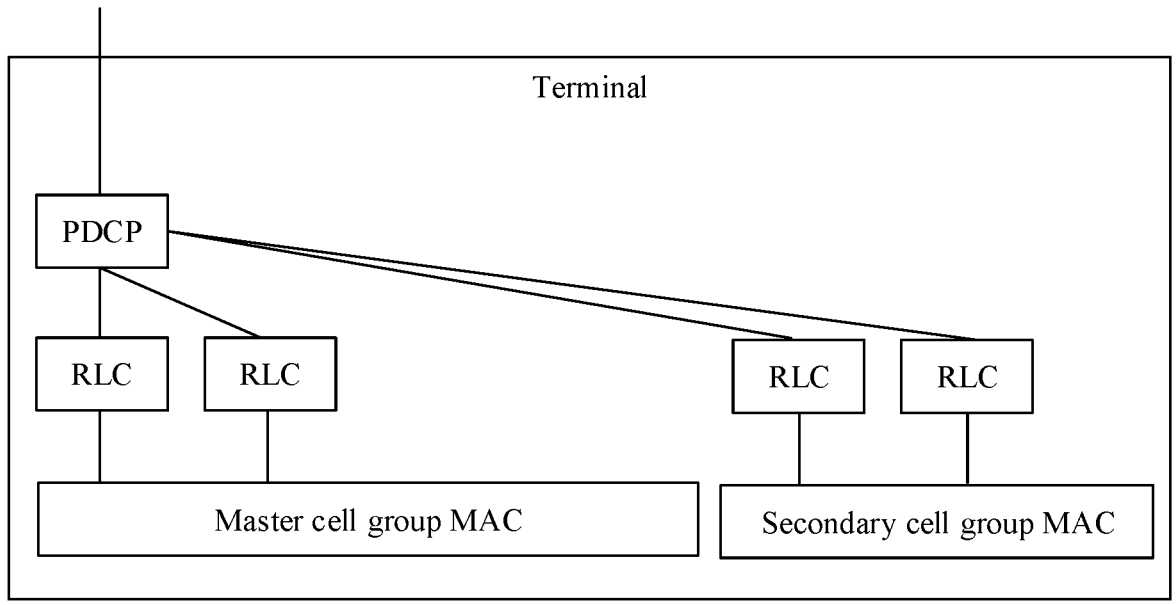
FIG. 4 is another schematic diagram of a bearer type of a multiple leg PDCP duplication function.

As shown in FIG. 3 and FIG. 4, more than two (for example, three) transmission paths may be configured for the PDCP duplication function (for example, one PDCP entity corresponds to three or more RLC entities). In this case, the network side may choose to deactivate one or more of the paths (for example, one path may be deactivated, but two transmission paths can still work, and the deactivated path is not used for data reception or transmission), but the PDCP duplication function can still be used through an activated path. For the deactivated path, the terminal cannot transmit data through the logical channel. For the activated path, the terminal can transmit data through the logical channel.

A technical issue to be addressed in this disclosure is as follows: A data duplication function may be configured for a radio bearer through radio resource control (RRC) while an initial activation state is also indicated, and activation or deactivation of the data duplication function may be subsequently controlled by using MAC CE signaling, to change a transmission path available for the radio bearer. After the multiple leg data duplication function is introduced, to more quickly change a transmission path available for a radio bearer to adapt to a dynamically changing channel condition, a method for selecting a transmission path by UE itself is introduced, and a network side does not need to transmit control signaling for changing a transmission path. No relevant detailed solution is yet available for the method for selecting a transmission path by UE itself.

In view of the foregoing problem, the embodiments of this disclosure provide a transmission path selection method, an information configuration method, a terminal, and a network device.

Figure 5:
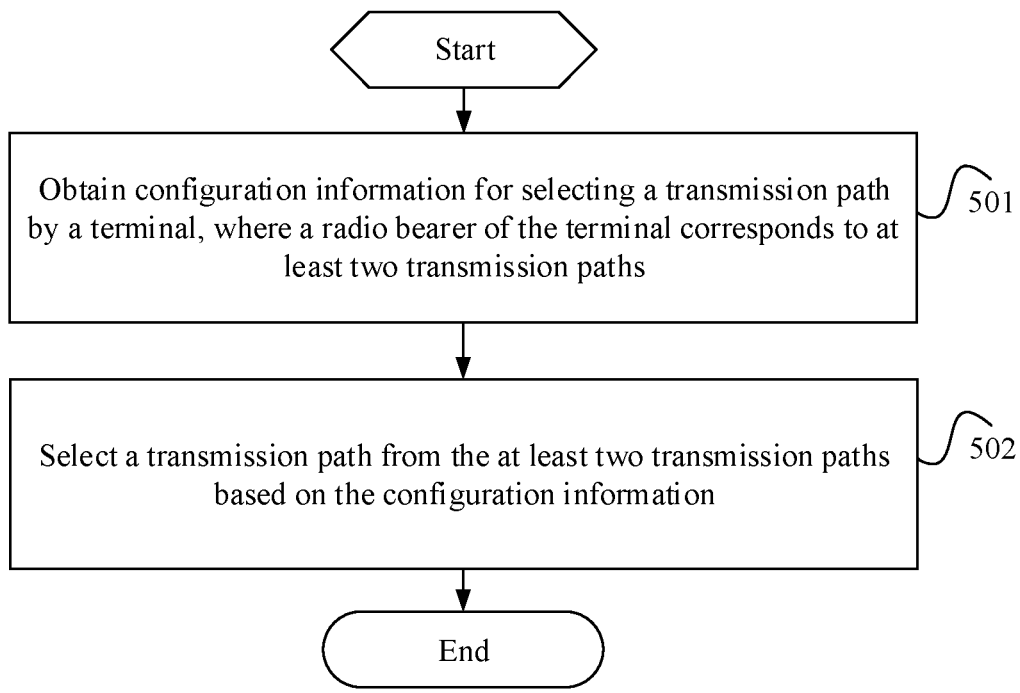
FIG. 5 is a schematic flowchart of a transmission path selection method according to some embodiments of this disclosure.

As shown in FIG. 5, some embodiments of this disclosure provide a transmission path selection method, applied to a terminal and including the following steps.

Step 501: Obtain configuration information for selecting a transmission path by the terminal, where a radio bearer of the terminal corresponds to at least two transmission paths.

The radio bearer of the terminal herein may be a signaling radio bearer (SRB) or a data radio bearer (DRB). More than two transmission paths may be configured for the radio bearer, for example, four transmission paths may be configured. A network side configures a PDCP duplication function for the radio bearer.

Step 502: Select a transmission path from the at least two transmission paths based on the configuration information.

The configuration information herein may include at least one of the following:

(1) a performance indicator based on which the terminal selects a transmission path; and (2) a trigger event for selecting a transmission path by the terminal.

The performance indicator herein may include at least one of the following: a packet loss rate, a delay, and a measurement result corresponding to a transmission path.

The measurement result corresponding to a transmission path herein may include at least one of the following: reference signal received power (RSRP), reference signal received quality (RSRQ), signal to interference plus noise ratio (SINR), signal to noise ratio (SNR), received signal strength indicator (RSSI), channel occupancy ratio (CR), and channel busy ratio (CBR).

Herein, if the transmission path is associated with one cell, the measurement result corresponding to the transmission path is a measurement result of the cell associated with the transmission path; or if the transmission path is associated with a plurality of cells, the measurement result corresponding to the transmission path is a measurement result of a cell with a highest measurement value among the plurality of cells associated with the transmission path, or a measurement result of a cell with a lowest measurement value among the plurality of cells associated with the transmission path, or an average value of measurement results of all the cells associated with the transmission path, or an average value of measurement results of at least two cells whose measurement results are above or below a preset threshold among the plurality of cells associated with the transmission path. The average value herein may be an arithmetic average, a geometric average, a harmonic average, a weighted average, or the like.

For example, if the transmission path is associated with a plurality of cells, the measurement result corresponding to the transmission path is a measurement result of a cell with a highest RSRP measurement value among the plurality of cells associated with the transmission path, or a measurement result of a cell with a lowest RSRP measurement value, or an average value of RSRP measurement results of all the cells associated with the transmission path, or an average value of RSRP measurement results of at least two cells whose RSRP measurement results are above or below a preset threshold among the plurality of cells associated with the transmission path. This is also applicable to the foregoing other performance indicators of the transmission path. Details are not described herein.

Herein, a performance indicator based on which whether the trigger event is satisfied is evaluated may be configured by the network side, or may be pre-agreed upon, for example, agreed upon in a protocol.

The trigger event herein may include at least one of the following:
(1) a trigger event for increasing the number of transmission paths (for example, the number of transmission paths currently in an active state is 1, and when the trigger event occurs, one or more transmission paths are additionally activated to make a total quantity reach a predetermined value, such as 3);
(2) a trigger event for reducing the number of transmission paths (for example, the number of transmission paths currently in an active state is 3, and when the trigger event occurs, one or more transmission paths currently in an active state are deactivated to make a total quantity reach a predetermined value, such as 2); and
(3) a trigger event for changing a transmission path (for example, when a transmission path currently in an active state satisfies a trigger condition, the currently active transmission path is changed).

In an embodiment of this disclosure, the trigger event for increasing the number of transmission paths may include one of the following:
(11) that performance corresponding to a performance indicator of any transmission path currently in an active state is lower than a first preset threshold; or
(12) that performance corresponding to a performance indicator of n1 transmission paths among current m1 transmission paths in an active state is lower than a second preset threshold.

There are a plurality of first preset thresholds or second preset thresholds. Different first preset thresholds are associated with different total numbers of active transmission paths. Different second preset thresholds are associated with different total numbers of active transmission paths.

Herein, for a radio bearer, a plurality of thresholds may be configured, and different thresholds are associated with different total numbers of active transmission paths.

Herein, when the performance indicator includes the packet loss rate, a higher packet loss rate indicates poorer performance of the transmission path, and a lower packet loss rate indicates better performance.

When the performance indicator includes the delay, a larger delay indicates poorer performance of the transmission path, and a smaller delay indicates better performance.

When the performance indicator includes the measurement result corresponding to the transmission path, for example, when the measurement result is RSRP, a larger RSRP value indicates better performance of the transmission path, and a smaller RSRP value indicates poorer performance;
when the measurement result is RSRQ, a larger RSRQ value indicates better performance of the transmission path, and a smaller RSRQ value indicates poorer performance;
when the measurement result is SINR, a larger SINR value indicates better performance of the transmission path, and a smaller SINR value indicates poorer performance;
when the measurement result is SNR, a larger SNR value indicates better performance of the transmission path, and a smaller SNR value indicates poorer performance;
when the measurement result is RSSI, a larger RSSI value indicates better performance of the transmission path, and a smaller RSSI value indicates poorer performance;
when the measurement result is CR, a larger CR value indicates poorer performance of the transmission path, and a smaller CR value indicates better performance; or
when the measurement result is CBR, a larger CBR value indicates poorer performance of the transmission path, and a smaller CBR value indicates better performance.

In an embodiment of this disclosure, the trigger event for reducing the number of transmission paths includes one of the following:
(21) that performance corresponding to a performance indicator of any transmission path currently in an active state is higher than a third preset threshold; or
(22) that performance corresponding to a performance indicator of n2 transmission paths among current m2 transmission paths in an active state is higher than a fourth preset threshold.

There are a plurality of third preset thresholds or fourth preset thresholds. Different third preset thresholds are associated with different total numbers of active transmission paths. Different fourth preset thresholds are associated with different total numbers of active transmission paths.

Herein, for a radio bearer, a plurality of thresholds may be configured, and different thresholds are associated with different total numbers of active transmission paths.

In an embodiment of this disclosure, the trigger event for changing the transmission path includes one of the following:
that performance corresponding to a performance indicator of a first target transmission path currently in an active state is lower than a fifth preset threshold; or
that performance corresponding to a performance indicator of a second target transmission path currently in an inactive state is higher than a sixth preset threshold; or
that performance corresponding to a performance indicator of a third target transmission path in an active state is lower than a seventh preset threshold, and that performance corresponding to a performance indicator of a fourth target transmission path in an inactive state is higher than an eighth preset threshold.

It should be noted that the first, second, third, fourth, fifth, sixth, seventh, and eighth preset thresholds are used only to distinguish between different cases, but do not indicate that they are in sequence or have another association relationship.

Similarly, the first target transmission path, the second target transmission path, the third target transmission path, and the fourth target transmission path are used only to distinguish between different cases, but do not indicate that they are in sequence or have another association relationship.

m1 and m2, and n1 and n2 are used only to distinguish between different cases, but do not indicate that they are in sequence or have another association relationship.

Certainly, n1 should be greater than or equal to 2 and less than or equal to m1, and n2 should be greater than or equal to 2 and less than or equal to m2.

In an embodiment of this disclosure, the selecting a transmission path from the at least two transmission paths based on the configuration information in step 502 may include:

after a condition of the trigger event is satisfied for a preset period of time, selecting the transmission path from the at least two transmission paths based on the configuration information. For example, the network side configures a corresponding trigger event according to the foregoing method. In addition, the network side configures that the trigger event needs to be satisfied for 3 seconds, where 3 seconds are timing duration of a timer. In this case, after the trigger event is satisfied, the UE starts the timer. After the timer expires, the UE selects a transmission path based on the configuration. In this way, it is ensured that a condition of the trigger event is always satisfied within the timing duration of the timer.

Further, step 502 may specifically include the following steps.

Step 121: When the trigger event includes the trigger event for increasing the number of transmission paths, after a condition of the trigger event for increasing the number of transmission paths is satisfied for a preset period of time, the terminal selects a transmission path that needs to be activated.

For example, when performance corresponding to a performance indicator of any transmission path currently in an active state is lower than the first preset threshold, the terminal selects a transmission path that needs to be activated, to increase the number of transmission paths, so that an increased total quantity of transmission paths is equal to a total quantity of active transmission paths associated with the first preset threshold.

During specific implementation, a transmission path 1 is currently in an active state. If performance corresponding to a performance indicator corresponding to the transmission path 1 is lower than a first threshold, the UE needs to additionally activate one transmission path, so that the number of active paths corresponding to the radio bearer is a total quantity (for example, 2) of active paths associated with the first threshold. Herein, if the performance corresponding to the performance indicator of the transmission path 1 is lower than the first threshold but higher than a second threshold, when activating a transmission path, the UE may activate a relatively small quantity of transmission paths. For example, when the total quantity of active paths associated with the first threshold is 2, the terminal may activate one transmission path to meet a requirement. The first threshold herein may be the foregoing first preset threshold, and a magnitude relationship between the second threshold and the first threshold may be determined based on transmission quality of a specific transmission path.

A transmission path 1 is currently in an active state. When performance corresponding to a performance indicator corresponding to the transmission path is lower than a third threshold, the UE needs to additionally activate three transmission paths, so that the number of active paths corresponding to the radio bearer is a total quantity (for example, 4) of active paths associated with the third threshold. Herein, if performance corresponding to a performance indicator indicated by the third threshold is also relatively poor, it indicates that the performance corresponding to the performance indicator of the transmission path 1 is already very poor. In this case, a relatively large quantity of transmission paths may be activated. For example, when the total quantity of active paths associated with the third threshold is 4, three transmission paths may be activated. The third threshold herein and the foregoing first threshold and second threshold are used only to distinguish between different cases, but do not indicate that they are in sequence or have another association relationship, and do not indicate a magnitude relationship among them either.

For another example, when performance corresponding to a performance indicator of n1 transmission paths among current m1 transmission paths in an active state is lower than the second preset threshold, the terminal selects a transmission path that needs to be activated, to increase the number of transmission paths, so that an increased total quantity of transmission paths is equal to a total quantity of active transmission paths associated with the second preset threshold. m1 and n1 are both positive integers. For example, transmission paths 1 and 2 are currently in an active state, RSRQ corresponding to the transmission paths 1 and 2 is lower than a threshold configured by a network, and the total quantity of active paths associated with the second preset threshold is 3. In this case, the UE needs to additionally activate one transmission path.

Step 122: When the trigger event includes the trigger event for reducing the number of transmission paths, after a condition of the trigger event for reducing the number of transmission paths is satisfied for a preset period of time, the terminal selects a transmission path that needs to be deactivated.

For example, when performance corresponding to a performance indicator of any transmission path currently in an active state is higher than the third preset threshold, the number of transmission paths is reduced, so that a reduced quantity of transmission paths is equal to a total quantity of active transmission paths associated with the third preset threshold. For example, transmission paths 1, 2, and 3 are currently in an active state. If performance corresponding to a performance indicator corresponding to the transmission path 2 is higher than a first threshold, the UE needs to deactivate one transmission path, so that the number of active paths corresponding to the radio bearer is a total quantity (for example, 2) of active paths associated with the first threshold.

For another example, when performance corresponding to a performance indicator of n2 transmission paths among current m2 transmission paths in an active state is higher than the fourth preset threshold, the number of transmission paths is reduced, so that a reduced quantity of transmission paths is equal to a total quantity of active transmission paths associated with the fourth preset threshold. m2 and n2 are both positive integers. For example, transmission paths 1, 2, and 3 are currently in an active state. If performance corresponding to the transmission path 1 is higher than a second threshold, the UE needs to deactivate one transmission path, so that the number of active paths corresponding to the radio bearer is a total quantity (for example, 2) of active paths associated with the second threshold.

Step 123: When the trigger event includes the trigger event for increasing the number of transmission paths and the trigger event for reducing the number of transmission paths, after a condition of the trigger event for increasing the number of transmission paths and a condition of the trigger event for reducing the number of transmission paths are satisfied for a preset period of time, the terminal randomly selects a transmission path that needs to be activated or a transmission path that needs to be deactivated, or the terminal selects, based on a network-side configuration or a protocol agreement, a transmission path that needs to be activated or a transmission path that needs to be deactivated. Herein, a condition of a trigger event for adding a transmission path and a condition of a trigger event for deleting a transmission path may be both satisfied. For example, the UE currently has three active paths: transmission paths 1, 2, and 3. A channel condition of the transmission path 1 is sufficiently good, and a condition for deleting one transmission path is satisfied. A channel condition of the transmission path 2 becomes worse, and a condition for adding one transmission path is satisfied. In this case, behavior of the UE is as follows:

A sequence that is pre-agreed upon may be followed. For example, behavior of adding a transmission path is performed first, and then behavior of deleting a transmission path is performed. For example, a transmission path 4 is added first, and then the transmission path 2 is deleted. Finally, active transmission paths are 1, 3, and 4.

Alternatively, a random sequence may be followed. For example, behavior of adding a transmission path is performed first, and then behavior of deleting a transmission path is performed; or behavior of deleting a transmission path is performed first, and then behavior of adding a transmission path is performed.

Step 124: When the trigger event includes the trigger event for changing the transmission path, after a condition of the trigger event for changing the transmission path is satisfied for a preset period of time, the terminal changes a target transmission path from an active state to an inactive state, or changes a target transmission path from an inactive state to an active state.

For example, when performance corresponding to a performance indicator of a first target transmission path currently in an active state is lower than a fifth preset threshold, the first target transmission path is deactivated.

For another example, when performance corresponding to a performance indicator of a second target transmission path currently in an inactive state is higher than a sixth preset threshold, the second target transmission path is deactivated.

For still another example, when performance corresponding to a performance indicator of a third target transmission path in an active state is lower than a seventh preset threshold, and performance corresponding to a performance indicator of a fourth target transmission path in an inactive state is higher than an eighth preset threshold, the third target transmission path is deactivated.

The selecting, by the terminal, a transmission path that needs to be activated in step 121 includes the following steps.

Step 1211: If the number of transmission paths that need to be activated is equal to that of transmission paths currently in an inactive state, activate all the transmission paths currently in the inactive state.

Step 1212: Alternatively, if the number of transmission paths that need to be activated is less than that of transmission paths currently in an inactive state, select, according to a first preset rule, a transmission path that needs to be activated. Herein, the selecting, according to a first preset rule, a transmission path that needs to be activated includes one of the following:

(A1) randomly selecting, by the terminal, N1 transmission paths that need to be activated from the transmission paths currently in the inactive state, and setting the selected N1 transmission paths to an active state;

(B1) selecting, by the terminal from the transmission paths currently in the inactive state, N2 transmission paths that need to be activated and whose performance indicator is greater than a preset value, and setting the selected N2 transmission paths to an active state, for example, the first N2 transmission paths are selected in descending order of RSRQ; and (C1) selecting, by the terminal according to a rule configured by a network side or agreed upon in a protocol, N3 transmission paths that need to be activated, and setting the selected N3 transmission paths to an active state, for example, a transmission path may be selected and activated only when performance corresponding to a performance indicator of the transmission path is higher than a threshold predetermined by the network side, where N1, N2, and N3 are all positive numbers greater than 1. It should be noted that, N1, N2, and N3 herein are used only to distinguish between different cases, but do not indicate that they are in sequence or have another association relationship.

The selecting, by the terminal, a transmission path that needs to be deactivated in step 122 includes the following steps.

Step 1221: If the number of transmission paths that need to be deactivated is equal to that of transmission paths currently in an active state, deactivate all the transmission paths currently in the active state, and transmit data by using a default transmission path configured by the network side for the radio bearer. For example, the default transmission path configured by the network side is 1. After both transmission paths 2 and 3 currently in an active state are deactivated, data is subsequently transmitted through the transmission path 1.

Step 1222: Alternatively, if the number of transmission paths that need to be deactivated is less than that of transmission paths currently in an active state, select, according to a second preset rule, a transmission path that needs to be deactivated. Herein, the selecting, according to a second preset rule, a transmission path that needs to be deactivated includes one of the following:

(A2) randomly selecting, by the terminal, N4 transmission paths that need to be deactivated from the transmission paths currently in the active state, and setting the selected N4 transmission paths to an inactive state;

(B2) selecting, by the terminal from the transmission paths currently in the active state, N5 transmission paths that need to be deactivated and whose performance indicator corresponds to performance lower than a preset value, and setting the selected N5 transmission paths to an inactive state, for example, the first N5 transmission paths are selected in ascending order of RSRQ; and (C2) selecting, by the terminal according to a rule configured by a network side or agreed upon in a protocol, N6 transmission paths that need to be deactivated, and setting the selected N6 transmission paths to an inactive state, for example, a transmission path may be selected and deactivated only when performance corresponding to a performance indicator of the transmission path is lower than a threshold predetermined by the network side, where N4, N5, and N6 are all positive numbers greater than 1. It should be noted that, N4, N5, and N6 herein are used only to distinguish between different cases, but do not indicate that they are in sequence or have another association relationship.

In the foregoing embodiment of this disclosure, when a multiple leg PDCP duplication function is configured for a radio bearer of the terminal, the network side may control, by configuring a trigger event for selecting a transmission path by the terminal itself, the terminal to select a transmission path by itself. This can avoid an additional delay caused by controlling transmission path selection through network-side signaling, and can also avoid unnecessary waste of resources caused by selecting a transmission path fully by the terminal itself.

Figure 6:
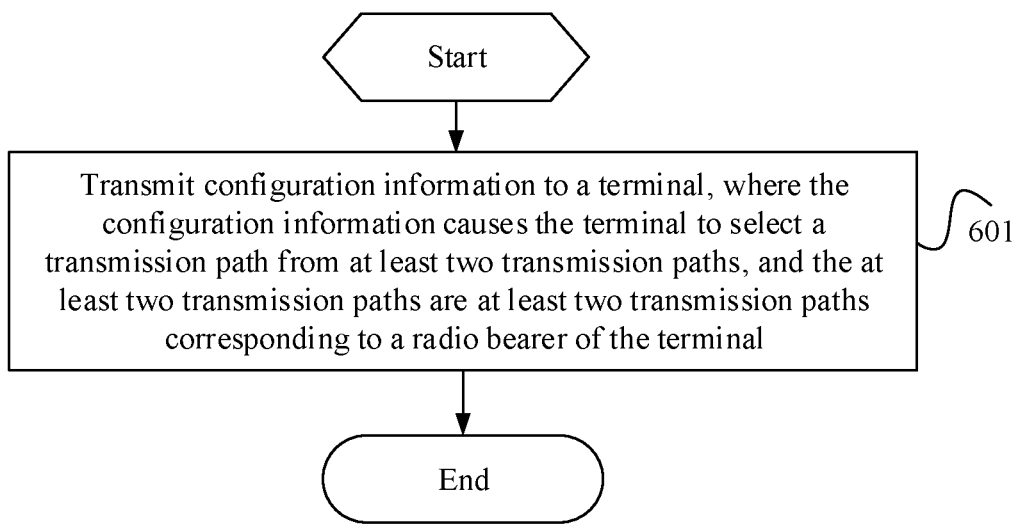
FIG. 6 is a schematic flowchart of an information configuration method according to some embodiments of this disclosure.

As shown in FIG. 6, some embodiments of this disclosure further provide an information configuration method, applied to a network device and including the following step.

Step 601: Transmit configuration information to a terminal, where the configuration information causes the terminal to select a transmission path from at least two transmission paths, and the at least two transmission paths are at least two transmission paths corresponding to a radio bearer of the terminal.

Optionally, the configuration information includes at least one of the following: a performance indicator based on which the terminal selects a transmission path, and a trigger event for selecting a transmission path by the terminal.

Further, the performance indicator includes at least one of the following: a packet loss rate, a delay, and a measurement result corresponding to a transmission path.

The measurement result corresponding to a transmission path includes at least one of the following: reference signal received power (RSRP), reference signal received quality (RSRQ), signal to interference plus noise ratio (SINR), signal to noise ratio (SNR), received signal strength indicator (RSSI), channel occupancy ratio (CR), and channel busy ratio (CBR).

If the transmission path is associated with one cell, the measurement result corresponding to the transmission path is a measurement result of the cell associated with the transmission path; or
    if the transmission path is associated with a plurality of cells, the measurement result corresponding to the transmission path is a measurement result of a cell with a highest measurement value among the plurality of cells associated with the transmission path, or a measurement result of a cell with a lowest measurement value among the plurality of cells associated with the transmission path, or an average value of measurement results of all the cells associated with the transmission path, or an average value of measurement results of at least two cells whose measurement results are above or below a preset threshold among the plurality of cells associated with the transmission path.

The trigger event includes at least one of the following: a trigger event for increasing the number of transmission paths, a trigger event for reducing the number of transmission paths, and a trigger event for changing a transmission path.

The trigger event for increasing the number of transmission paths includes one of the following:
    that performance corresponding to a performance indicator of any transmission path currently in an active state is lower than a first preset threshold; or
    that performance corresponding to a performance indicator of n1 transmission paths among current m1 transmission paths in an active state is lower than a second preset threshold, where m1 and n1 are both positive integers, and n1 is greater than or equal to 2 and less than or equal to m1.

There are a plurality of first preset thresholds or second preset thresholds. Different first preset thresholds are associated with different total numbers of active transmission paths. Different second preset thresholds are associated with different total numbers of active transmission paths.

The trigger event for reducing the number of transmission paths includes one of the following:
    that performance corresponding to a performance indicator of any transmission path currently in an active state is higher than a third preset threshold; or
    that performance corresponding to a performance indicator of n2 transmission paths among current m2 transmission paths in an active state is higher than a fourth preset threshold, where m2 and n2 are both positive integers, and n2 is greater than or equal to 2 and less than or equal to m2.

There are a plurality of third preset thresholds or fourth preset thresholds. Different third preset thresholds are associated with different total numbers of active transmission paths. Different fourth preset thresholds are associated with different total numbers of active transmission paths.

The trigger event for changing the transmission path includes one of the following:
    that performance corresponding to a performance indicator of a first target transmission path currently in an active state is lower than a fifth preset threshold; or
    that performance corresponding to a performance indicator of a second target transmission path currently in an inactive state is higher than a sixth preset threshold; or
    that performance corresponding to a performance indicator of a third target transmission path in an active state is lower than a seventh preset threshold, and that performance corresponding to a performance indicator of a fourth target transmission path in an inactive state is higher than an eighth preset threshold.

It should be noted that all the descriptions of the network device in the foregoing embodiment are applicable to the embodiment of the information configuration method, and the same technical effects can be achieved.

Figure 7:
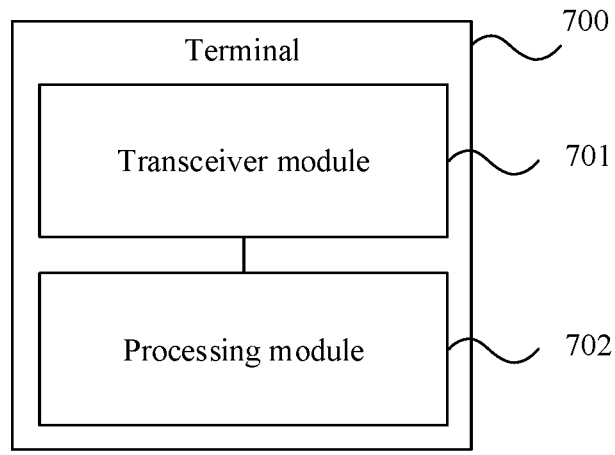
FIG. 7 is a schematic modular diagram of a terminal according to some embodiments of this disclosure.

As shown in FIG. 7, some embodiments of this disclosure provide a terminal 700, including:
    a transceiver module 701, configured to obtain configuration information for selecting a transmission path by the terminal, where a radio bearer of the terminal corresponds to at least two transmission paths; and
    a processing module 702, configured to select a transmission path from the at least two transmission paths based on the configuration information.

The configuration information includes at least one of the following: a performance indicator based on which the terminal selects a transmission path, and a trigger event for selecting a transmission path by the terminal.

The performance indicator includes at least one of the following: a packet loss rate, a delay, and a measurement result corresponding to a transmission path.

The measurement result corresponding to a transmission path includes at least one of the following: reference signal received power (RSRP), reference signal received quality (RSRQ), signal to interference plus noise ratio (SINR), signal to noise ratio (SNR), received signal strength indicator (RSSI), channel occupancy ratio (CR), and channel busy ratio (CBR).

If the transmission path is associated with one cell, the measurement result corresponding to the transmission path is a measurement result of the cell associated with the transmission path; or
    if the transmission path is associated with a plurality of cells, the measurement result corresponding to the transmission path is a measurement result of a cell with a highest measurement value among the plurality of cells associated with the transmission path, or a measurement result of a cell with a lowest measurement value among the plurality of cells associated with the transmission path, or an average value of measurement results of all the cells associated with the transmission path, or an average value of measurement results of at least two cells whose measurement results are above or below a preset threshold among the plurality of cells associated with the transmission path.

The trigger event includes at least one of the following: a trigger event for increasing the number of transmission paths, a trigger event for reducing the number of transmission paths, and a trigger event for changing a transmission path.

The trigger event for increasing the number of transmission paths includes one of the following:
  that performance corresponding to a performance indicator of any transmission path currently in an active state is lower than a first preset threshold; or
  that performance corresponding to a performance indicator of n1 transmission paths among current m1 transmission paths in an active state is lower than a second preset threshold, where m1 and n1 are both positive integers, and n1 is greater than or equal to 2 and less than or equal to m1.

There are a plurality of first preset thresholds or second preset thresholds. Different first preset thresholds are associated with different total numbers of active transmission paths. Different second preset thresholds are associated with different total numbers of active transmission paths.

The trigger event for reducing the number of transmission paths includes one of the following:
  that performance corresponding to a performance indicator of any transmission path currently in an active state is higher than a third preset threshold; or
  that performance corresponding to a performance indicator of n2 transmission paths among current m2 transmission paths in an active state is higher than a fourth preset threshold, where m2 and n2 are both positive integers, and n2 is greater than or equal to 2 and less than or equal to m2.

There are a plurality of third preset thresholds or fourth preset thresholds. Different third preset thresholds are associated with different total numbers of active transmission paths. Different fourth preset thresholds are associated with different total numbers of active transmission paths.

The trigger event for changing the transmission path includes one of the following:
  that performance corresponding to a performance indicator of a first target transmission path currently in an active state is lower than a fifth preset threshold; or
  that performance corresponding to a performance indicator of a second target transmission path currently in an inactive state is higher than a sixth preset threshold; or
  that performance corresponding to a performance indicator of a third target transmission path in an active state is lower than a seventh preset threshold, and that performance corresponding to a performance indicator of a fourth target transmission path in an inactive state is higher than an eighth preset threshold.

The selecting a transmission path from the at least two transmission paths based on the configuration information includes: after a condition of the trigger event is satisfied for a preset period of time, selecting the transmission path from the at least two transmission paths based on the configuration information.

Specifically, when the trigger event includes the trigger event for increasing the number of transmission paths, after a condition of the trigger event for increasing the number of transmission paths is satisfied for a preset period of time, the terminal selects a transmission path that needs to be activated;
  when the trigger event includes the trigger event for reducing the number of transmission paths, after a condition of the trigger event for reducing the number of transmission paths is satisfied for a preset period of time, the terminal selects a transmission path that needs to be deactivated;
  when the trigger event includes the trigger event for increasing the number of transmission paths and the trigger event for reducing the number of transmission paths, after a condition of the trigger event for increasing the number of transmission paths and a condition of the trigger event for reducing the number of transmission paths are satisfied for a preset period of time, the terminal randomly selects a transmission path that needs to be activated or a transmission path that needs to be deactivated, or the terminal selects, based on a network-side configuration or a protocol agreement, a transmission path that needs to be activated or a transmission path that needs to be deactivated; or
  when the trigger event includes the trigger event for changing the transmission path, after a condition of the trigger event for changing the transmission path is satisfied for a preset period of time, the terminal changes a target transmission path from an active state to an inactive state, or changes a target transmission path from an inactive state to an active state.

The selecting, by the terminal, a transmission path that needs to be activated includes:
  if the number of transmission paths that need to be activated is equal to that of transmission paths currently in an inactive state, activating all the transmission paths currently in the inactive state; or
  if the number of transmission paths that need to be activated is less than that of transmission paths currently in an inactive state, selecting, according to a first preset rule, a transmission path that needs to be activated.

The selecting, according to a first preset rule, a transmission path that needs to be activated includes one of the following:
  randomly selecting, by the terminal, N1 transmission paths that need to be activated from the transmission paths currently in the inactive state, and setting the selected N1 transmission paths to an active state;
  selecting, by the terminal from the transmission paths currently in the inactive state, N2 transmission paths that need to be activated and whose performance indicator is greater than a preset value, and setting the selected N2 transmission paths to an active state; and
  selecting, by the terminal according to a rule configured by a network side or agreed upon in a protocol, N3 transmission paths that need to be activated, and setting the selected N3 transmission paths to an active state, where N1, N2, and N3 are all positive numbers greater than 1.

The selecting, by the terminal, a transmission path that needs to be deactivated includes:
  if the number of transmission paths that need to be deactivated is equal to that of transmission paths currently in an active state, deactivating all the transmission paths currently in the active state, and transmitting data by using a default transmission path configured by a network side for the radio bearer; or if the number of transmission paths that need to be deactivated is less than that of transmission paths currently in an active state, selecting, according to a second preset rule, a transmission path that needs to be deactivated.

The selecting, according to a second preset rule, a transmission path that needs to be deactivated includes one of the following:

randomly selecting, by the terminal, N4 transmission paths that need to be deactivated from the transmission paths currently in the active state, and setting the selected N4 transmission paths to an inactive state;

selecting, by the terminal from the transmission paths currently in the active state, N5 transmission paths that need to be deactivated and whose performance indicator corresponds to performance lower than a preset value, and setting the selected N5 transmission paths to an inactive state; and selecting, by the terminal according to a rule configured by a network side or agreed upon in a protocol, N6 transmission paths that need to be deactivated, and setting the selected N6 transmission paths to an inactive state, where N4, N5, and N6 are all positive numbers greater than 1.

It should be noted that, the terminal embodiment is a terminal corresponding to the foregoing transmission path selection method applied to a terminal, all implementations of the foregoing embodiment are applicable to the terminal embodiment, and the same technical effects can be achieved.

Figure 8:
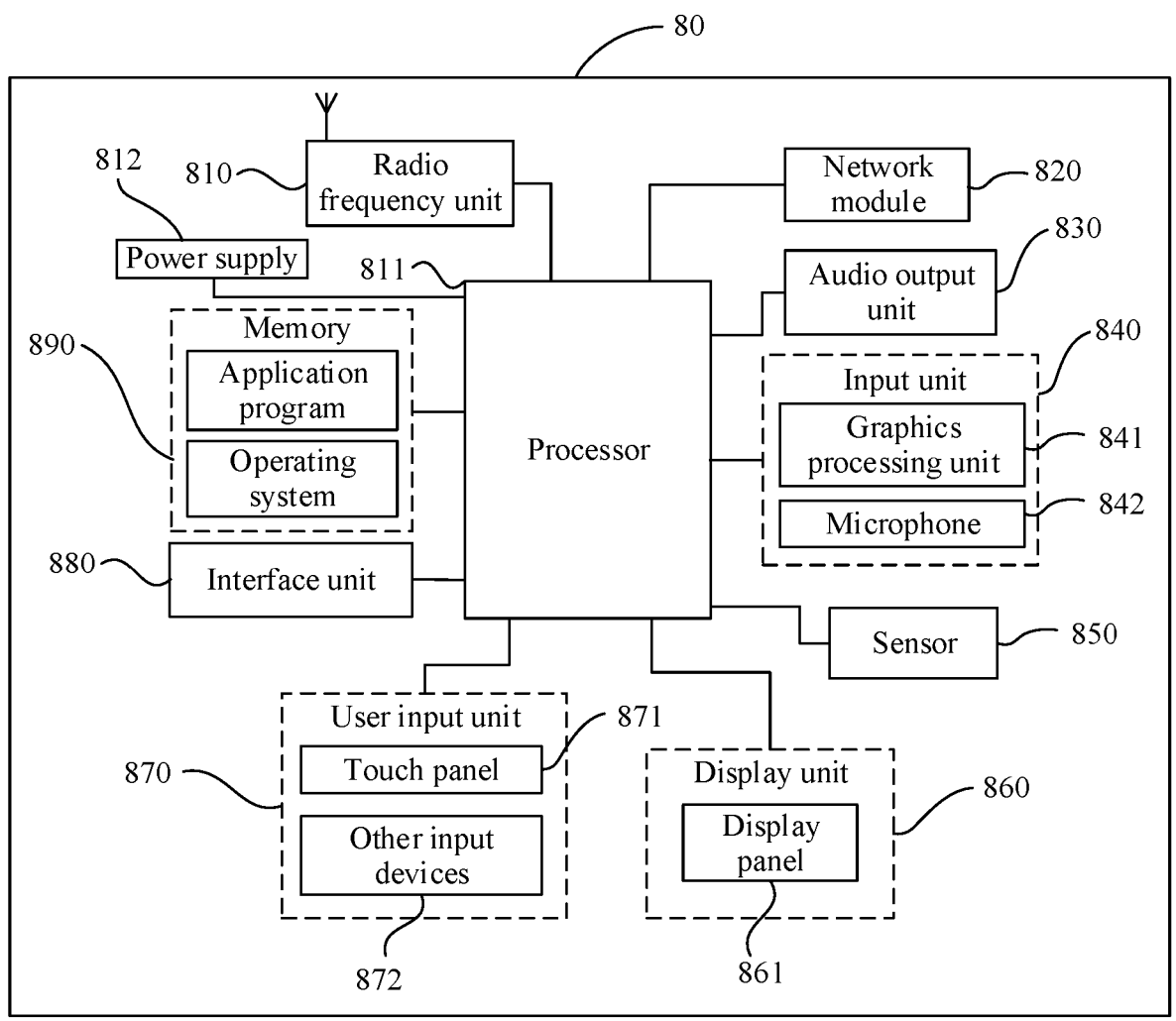
FIG. 8 is a structural block diagram of a terminal according to some embodiments of this disclosure.

FIG. 8 is a schematic diagram of a hardware structure of a terminal for implementing some embodiments of this disclosure.

The terminal 80 includes but is not limited to components such as a radio frequency unit 810, a network module 820, an audio output unit 830, an input unit 840, a sensor 850, a display unit 860, a user input unit 870, an interface unit 880, a memory 890, a processor 811, and a power supply 812. A person skilled in the art can understand that the terminal structure shown in FIG. 8 does not constitute a limitation on the terminal. The terminal may include more or fewer components than those shown in the figure, or some components may be combined, or there may be a different component layout. In some embodiments of this disclosure, the terminal includes but is not limited to a mobile phone, a tablet computer, a laptop computer, a palmtop computer, an in-vehicle terminal, a wearable device, a pedometer, and the like.

The processor 811 is configured to: obtain configuration information for selecting a transmission path by the terminal, where a radio bearer of the terminal corresponds to at least two transmission paths; and select a transmission path from the at least two transmission paths based on the configuration information.

In the terminal embodiment of this disclosure, when a multiple leg PDCP duplication function is configured for a radio bearer of the terminal, a network side may control, by configuring a trigger event for selecting a transmission path by the terminal itself, the terminal to select a transmission path by itself. This can avoid an additional delay caused by controlling transmission path selection through network-side signaling, and can also avoid unnecessary waste of resources caused by selecting a transmission path fully by the terminal itself.

It should be understood that, in some embodiments of this disclosure, the radio frequency unit 810 may be configured to transmit or receive a signal in an information transmitting/receiving or call process. Specifically, the radio frequency unit 810 receives downlink data from a network device and transmits the downlink data to the processor 811 for processing; and transmits uplink data to the network device. Usually, the radio frequency unit 810 includes but is not limited to an antenna, at least one amplifier, a transceiver, a coupler, a low noise amplifier, a duplexer, and the like. In addition, the radio frequency unit 810 may further communicate with a network and another device by using a wireless communications system.

The terminal provides wireless broadband Internet access for a user by using the network module 820, for example, helps the user transmit and receive e-mails, browse web pages, and access streaming media.

The audio output unit 830 may convert audio data received by the radio frequency unit 810 or the network module 820 or stored in the memory 890 into an audio signal and output the audio signal as a sound. In addition, the audio output unit 830 may further provide audio output (for example, a call signal reception sound or a message reception sound) related to a specific function performed by the terminal 80. The audio output unit 830 includes a speaker, a buzzer, a receiver, and the like.

The input unit 840 is configured to receive an audio or video signal. The input unit 840 may include a graphics processing unit (GPU) 841 and a microphone 842. The graphics processing unit 841 processes image data of a static picture or a video that is obtained by an image capture apparatus (for example, a camera) in a video capture mode or an image capture mode. A processed image frame may be displayed on the display unit 860. The image frame processed by the graphics processing unit 841 may be stored in the memory 890 (or another storage medium) or transmitted by the radio frequency unit 810 or the network module 820. The microphone 842 may receive sounds and process such sounds into audio data. The processed audio data may be converted, in a telephone call mode, into a format that can be transmitted to a mobile communications network device through the radio frequency unit 810, for outputting.

The terminal 80 further includes at least one sensor 850, for example, an optical sensor, a motion sensor, and another sensor. Specifically, the optical sensor includes an ambient light sensor and a proximity sensor. The ambient light sensor may adjust brightness of a display panel 861 based on intensity of ambient light. When the terminal 80 moves to an ear, the proximity sensor may turn off the display panel 861 and/or backlight. As a motion sensor, an accelerometer sensor may detect magnitudes of accelerations in all directions (usually three axes), may detect a magnitude and a direction of gravity when the terminal is still, and may be applied to posture recognition (for example, landscape/portrait mode switching, a related game, or magnetometer posture calibration) of the terminal, a function related to vibration recognition (for example, a pedometer or a keystroke), or the like. The sensor 850 may further include a fingerprint sensor, a pressure sensor, an iris sensor, a molecular sensor, a gyroscope, a barometer, a hygrometer, a thermometer, an infrared sensor, or the like. Details are not described herein.

The display unit 860 is configured to display information entered by the user or information provided for the user. The display unit 860 may include the display panel 861, and the display panel 861 may be configured in a form of a liquid crystal display (LCD), an organic light-emitting diode (OLED), or the like.

The user input unit 870 may be configured to receive input digit or character information and generate key signal input related to user setting and function control of the terminal. Specifically, the user input unit 870 includes a touch panel 871 and other input devices 872. The touch panel 871, also referred to as a touchscreen, may collect a touch operation performed by a user on or near the touch panel 871 (for example, an operation performed by the user on the touch panel 871 or near the touch panel 871 by using a finger or any appropriate object or accessory such as a stylus). The touch panel 871 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into contact coordinates, transmits the contact coordinates to the processor 811, receives a command transmitted by the processor 811, and executes the command. In addition, the touch panel 871 may be implemented in a plurality of types, for example, a resistive type, a capacitive type, an infrared type, and a surface acoustic wave type. In addition to the touch panel 871, the user input unit 870 may further include the other input devices 872. Specifically, the other input devices 872 may include but are not limited to a physical keyboard, a function key (such as a volume control key or an on/off key), a trackball, a mouse, and a joystick. Details are not described herein.

Further, the touch panel 871 may cover the display panel 861. After detecting a touch operation on or near the touch panel 871, the touch panel 871 transmits the touch operation to the processor 811 to determine a type of a touch event. Then the processor 811 provides corresponding visual output on the display panel 861 based on the type of the touch event. In FIG. 8, the touch panel 871 and the display panel 861 serve as two separate components to implement input and output functions of the terminal. However, in some embodiments, the touch panel 871 and the display panel 861 may be integrated to implement the input and output functions of the terminal. This is not specifically limited herein.

The interface unit 880 is an interface for connecting an external apparatus to the terminal 80. For example, the external apparatus may include a wired or wireless headset port, an external power (or battery charger) port, a wired or wireless data port, a memory card port, a port for connecting an apparatus having an identification module, an audio input/output (I/O) port, a video I/O port, an earphone port, and the like. The interface unit 880 may be configured to receive input (for example, data information and electric power) from the external apparatus, and transmit the received input to one or more elements in the terminal 80; or may be configured to transmit data between the terminal 80 and the external apparatus.

The memory 890 may be configured to store software programs and various data. The memory 890 may mainly include a program storage region and a data storage region. The program storage region may store an operating system, an application program required by at least one function (for example, an audio play function or an image play function), and the like. The data storage region may store data (for example, audio data or a phone book) created based on usage of the mobile phone. In addition, the memory 890 may include a high-speed random access memory, or may include a nonvolatile memory, for example, at least one magnetic disk storage device or a flash memory device, or other volatile solid-state storage device.

The processor 811 is a control center of the terminal, connects various parts of the entire terminal by using various interfaces and lines, and performs various functions and data processing of the terminal by running or executing a software program and/or a module stored in the memory 890 and invoking data stored in the memory 890, to perform overall monitoring on the terminal. The processor 811 may include one or more processing units. Optionally, the processor 811 may integrate an application processor and a modem processor. The application processor mainly processes an operating system, a user interface, an application program, and the like. The modem processor mainly processes wireless communication. It can be understood that the modem processor may be alternatively not integrated in the processor 811.

The terminal 80 may further include the power supply 812 (for example, a battery) that supplies power to each component. Optionally, the power supply 812 may be logically connected to the processor 811 by using a power management system, to implement functions such as charging management, discharging management, and power consumption management by using the power management system.

In addition, the terminal 80 includes some functional modules that are not shown. Details are not described herein.

Optionally, some embodiments of this disclosure further provide a terminal, including a processor 811, a memory 890, and a computer program stored in the memory 890 and capable of running on the processor 811. When the computer program is executed by the processor 811, the processes of the embodiment of the transmission path selection method applied to the terminal side are implemented, and the same technical effects can be achieved. To avoid repetition, details are not described herein again.

Some embodiments of this disclosure further provide a computer-readable storage medium. The computer-readable storage medium stores a computer program. When the computer program is executed by a processor, the processes of the embodiment of the transmission path selection method applied to the terminal side are implemented, and the same technical effects can be achieved. To avoid repetition, details are not described herein again. For example, the computer-readable storage medium is a read-only memory (ROM for short), a random access memory (RAM for short), a magnetic disk, or an optical disc.

Figure 9:
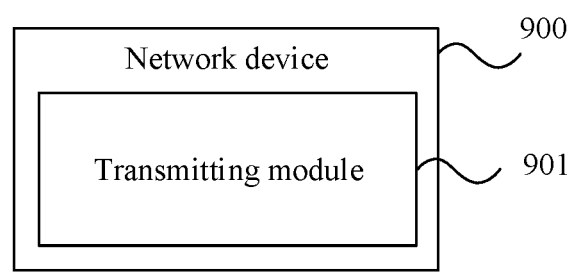
FIG. 9 is a schematic modular diagram of a network device according to some embodiments of this disclosure.

As shown in FIG. 9, some embodiments of this disclosure further provide a network device 900, including:

a transmitting module 901, configured to transmit configuration information to a terminal, where the configuration information causes the terminal to select a transmission path from at least two transmission paths, and the at least two transmission paths are at least two transmission paths corresponding to a radio bearer of the terminal.

The configuration information includes at least one of the following: a performance indicator based on which the terminal selects a transmission path, and a trigger event for selecting a transmission path by the terminal.

The performance indicator includes at least one of the following: a packet loss rate, a delay, and a measurement result corresponding to a transmission path.

The measurement result corresponding to a transmission path includes at least one of the following: reference signal received power (RSRP), reference signal received quality (RSRQ), signal to interference plus noise ratio (SINR), signal to noise ratio (SNR), received signal strength indicator (RSSI), channel occupancy ratio (CR), and channel busy ratio (CBR).

If the transmission path is associated with one cell, the measurement result corresponding to the transmission path is a measurement result of the cell associated with the transmission path; or if the transmission path is associated with a plurality of cells, the measurement result corresponding to the transmission path is a measurement result of a cell with a highest measurement value among the plurality of cells associated with the transmission path, or a measurement result of a cell with a lowest measurement value among the plurality of cells associated with the transmission path, or an average value of measurement results of all the cells associated with the transmission path, or an average value of measurement results of at least two cells whose measurement results are above or below a preset threshold among the plurality of cells associated with the transmission path.

The trigger event includes at least one of the following: a trigger event for increasing the number of transmission paths, a trigger event for reducing the number of transmission paths, and a trigger event for changing a transmission path.

The trigger event for increasing the number of transmission paths includes one of the following:

that performance corresponding to a performance indicator of any transmission path currently in an active state is lower than a first preset threshold; or that performance corresponding to a performance indicator of n1 transmission paths among current m1 transmission paths in an active state is lower than a second preset threshold, where m1 and n1 are both positive integers, and n1 is greater than or equal to 2 and less than or equal to m1.

There are a plurality of first preset thresholds or second preset thresholds. Different first preset thresholds are associated with different total numbers of active transmission paths. Different second preset thresholds are associated with different total numbers of active transmission paths.

The trigger event for reducing the number of transmission paths includes one of the following:

that performance corresponding to a performance indicator of any transmission path currently in an active state is higher than a third preset threshold; or that performance corresponding to a performance indicator of n2 transmission paths among current m2 transmission paths in an active state is higher than a fourth preset threshold, where m2 and n2 are both positive integers, and n2 is greater than or equal to 2 and less than or equal to m2.

There are a plurality of third preset thresholds or fourth preset thresholds. Different third preset thresholds are associated with different total numbers of active transmission paths. Different fourth preset thresholds are associated with different total numbers of active transmission paths.

The trigger event for changing the transmission path includes one of the following:

that performance corresponding to a performance indicator of a first target transmission path currently in an active state is lower than a fifth preset threshold; or that performance corresponding to a performance indicator of a second target transmission path currently in an inactive state is higher than a sixth preset threshold; or that performance corresponding to a performance indicator of a third target transmission path in an active state is lower than a seventh preset threshold, and that performance corresponding to a performance indicator of a fourth target transmission path in an inactive state is higher than an eighth preset threshold.

Some embodiments of this disclosure further provide a network device, including a memory, a processor, and a computer program stored in the memory and capable of running on the processor. When the computer program is executed by the processor, the processes of the embodiment of the information configuration method applied to the network device are implemented, and the same technical effects can be achieved. To avoid repetition, details are not described herein again.

Some embodiments of this disclosure further provide a computer-readable storage medium. The computer-readable storage medium stores a computer program. When the computer program is executed by a processor, the processes of the embodiment of the information configuration method applied to the network device are implemented, and the same technical effects can be achieved. To avoid repetition, details are not described herein again. For example, the computer-readable storage medium is a read-only memory (ROM for short), a random access memory (RAM for short), a magnetic disk, or an optical disc.

Figure 10:
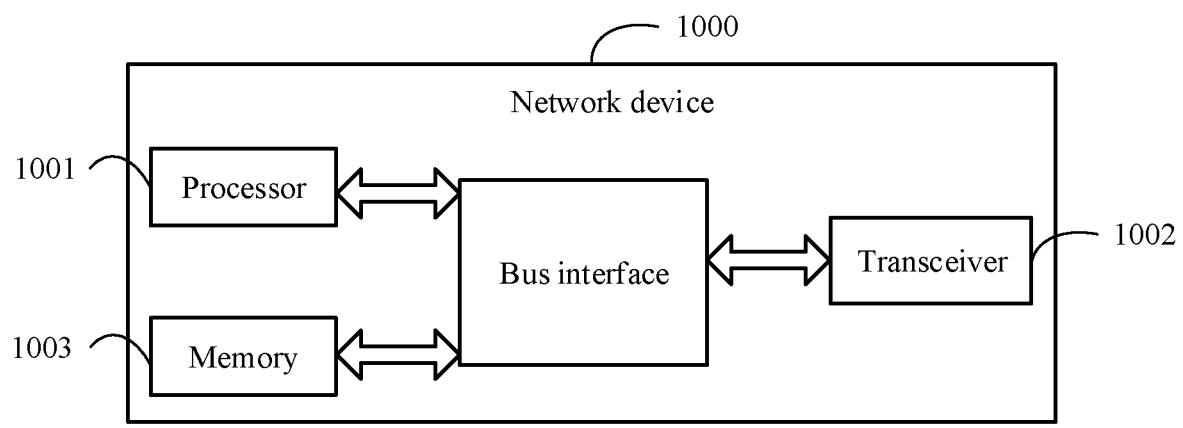
FIG. 10 is a structural block diagram of a network device according to some embodiments of this disclosure.

FIG. 10 is a structural diagram of a network device according to an embodiment of this disclosure. The network device is capable of implementing details of the foregoing information configuration method, with the same effects achieved. As shown in FIG. 10, the network device 1000 includes a processor 1001, a transceiver 1002, a memory 1003, and a bus interface.

The processor 1001 is configured to read a program in the memory 1003 and perform the following process:

transmitting, by using the transceiver 1002, configuration information to a terminal, where the configuration information causes the terminal to select a transmission path from at least two transmission paths, and the at least two transmission paths are at least two transmission paths corresponding to a radio bearer of the terminal.

In FIG. 10, a bus architecture may include any quantity of interconnected buses and bridges, specifically for interconnecting various circuits of one or more processors represented by the processor 1001 and a memory represented by the memory 1003. The bus architecture may further interconnect various other circuits such as a peripheral device, a voltage regulator, and a power management circuit. These are all well known in the art, and therefore are not further described in this specification. The bus interface provides an interface. The transceiver 1002 may be a plurality of components, including a transmitter and a receiver, and provides units for communicating with a variety of other apparatuses on a transmission medium.

The configuration information includes at least one of the following: a performance indicator based on which the terminal selects a transmission path, and a trigger event for selecting a transmission path by the terminal.

The performance indicator includes at least one of the following: a packet loss rate, a delay, and a measurement result corresponding to a transmission path.

The measurement result corresponding to a transmission path includes at least one of the following: reference signal received power (RSRP), reference signal received quality (RSRQ), signal to interference plus noise ratio (SINR), signal to noise ratio (SNR), received signal strength indicator (RSSI), channel occupancy ratio (CR), and channel busy ratio (CBR).

If the transmission path is associated with one cell, the measurement result corresponding to the transmission path is a measurement result of the cell associated with the transmission path; or if the transmission path is associated with a plurality of cells, the measurement result corresponding to the transmission path is a measurement result of a cell with a highest measurement value among the plurality of cells associated with the transmission path, or a measurement result of a cell with a lowest measurement value among the plurality of cells associated with the transmission path, or an average value of measurement results of all the cells associated with the transmission path, or an average value of measurement results of at least two cells whose measurement results are above or below a preset threshold among the plurality of cells associated with the transmission path.

The trigger event includes at least one of the following: a trigger event for increasing the number of transmission paths, a trigger event for reducing the number of transmission paths, and a trigger event for changing a transmission path.

The trigger event for increasing the number of transmission paths includes one of the following:
that performance corresponding to a performance indicator of any transmission path currently in an active state is lower than a first preset threshold; or
that performance corresponding to a performance indicator of n1 transmission paths among current m1 transmission paths in an active state is lower than a second preset threshold, where m1 and n1 are both positive integers, and n1 is greater than or equal to 2 and less than or equal to m1.

There are a plurality of first preset thresholds or second preset thresholds. Different first preset thresholds are associated with different total numbers of active transmission paths. Different second preset thresholds are associated with different total numbers of active transmission paths.

The trigger event for reducing the number of transmission paths includes one of the following:
that performance corresponding to a performance indicator of any transmission path currently in an active state is higher than a third preset threshold; or
that performance corresponding to a performance indicator of n2 transmission paths among current m2 transmission paths in an active state is higher than a fourth preset threshold, where m2 and n2 are both positive integers, and n2 is greater than or equal to 2 and less than or equal to m2.

There are a plurality of third preset thresholds or fourth preset thresholds. Different third preset thresholds are associated with different total numbers of active transmission paths. Different fourth preset thresholds are associated with different total numbers of active transmission paths.

The trigger event for changing the transmission path includes one of the following:
that performance corresponding to a performance indicator of a first target transmission path currently in an active state is lower than a fifth preset threshold; or
that performance corresponding to a performance indicator of a second target transmission path currently in an inactive state is higher than a sixth preset threshold; or
that performance corresponding to a performance indicator of a third target transmission path in an active state is lower than a seventh preset threshold, and that performance corresponding to a performance indicator of a fourth target transmission path in an inactive state is higher than an eighth preset threshold.

The network device may be a base transceiver station (BTS for short) in a global system for mobile communications (GSM for short) or code division multiple access (CDMA for short), or may be a NodeB (NB for short) in wideband code division multiple access (WCDMA for short), or may be an evolved NodeB (eNB or eNodeB for short), a relay station, or an access point in LTE, or may be a base station in a future 5G network, or the like. This is not limited herein.

A person of ordinary skill in the art may be aware that, in combination with the examples described in the embodiments disclosed in this specification, units, algorithms, and steps may be implemented by electronic hardware or a combination of computer software and electronic hardware. Whether these functions are performed by hardware or software depends on particular applications and design constraints of the technical solutions. A person skilled in the art may use different methods to implement the described functions for each particular application, but it should not be considered that the implementation goes beyond the scope of this disclosure.

It can be clearly understood by a person skilled in the art that, for convenience and brevity of description, for a detailed working process of the foregoing system, apparatus, and unit, reference may be made to a corresponding process in the foregoing method embodiments, and details are not described herein again.

In the embodiments provided in this application, it should be understood that the disclosed apparatus and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this disclosure may be integrated into one processing unit, or each of the units may exist alone physically, or two or more units may be integrated into one unit.

When the function is implemented in a form of a software functional unit and sold or used as an independent product, the function may be stored in a computer-readable storage medium. Based on such an understanding, the technical solutions of this disclosure essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this disclosure. The foregoing storage medium includes any medium that can store program code, such as a USB flash drive, a removable hard disk, a ROM, a RAM, a magnetic disk, or an optical disc.

In addition, it should be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in a sequence of description and in a time sequence, but do not need to be performed necessarily in the time sequence, and some steps may be performed in parallel or independently. A person of ordinary skill in the art can understand that all or any steps or components of the method and apparatus in this disclosure may be implemented by hardware, firmware, software, or a combination thereof in any computing apparatus (including a processor, a storage medium, and the like) or a network of computing apparatuses. This can be implemented provided that a person of ordinary skill in the art applies basic programming skills after reading the specification of this disclosure.

It can be understood that the embodiments described in this disclosure may be implemented by hardware, software, firmware, middleware, microcode, or a combination thereof. For hardware implementation, a module, a unit, a sub-module, a sub-unit, or the like may be implemented in one or more application-specific integrated circuits (ASIC), digital signal processors (DSP), digital signal processing devices (DSP Device, DSPD), programmable logic devices (PLD), field-programmable gate arrays (FPGA), general-purpose processors, controllers, microcontrollers, microprocessors, and other electronic units for performing the functions described in this disclosure, or a combination thereof.

For software implementation, the techniques described in the embodiments of this disclosure may be implemented by modules (for example, procedures or functions) that perform the functions described in the embodiments of this disclosure. Software code may be stored in the memory and executed by the processor. The memory may be implemented in or outside the processor.

Therefore, an objective of this disclosure may also be achieved by running a program or a group of programs on any computing apparatus. The computing apparatus may be a well-known general apparatus. Therefore, the objective of this disclosure may also be achieved by merely providing a program product including program code for implementing the method or apparatus. To be specific, the program product also constitutes this disclosure, and a storage medium storing the program product also constitutes this disclosure. Apparently, the storage medium may be any well-known storage medium or any storage medium that is to be developed in the future. It should also be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in a sequence of description and in a time sequence, but are not necessarily performed in the time sequence. Some steps may be performed in parallel or independently.

The foregoing descriptions are merely optional implementations of this disclosure. It should be noted that a person of ordinary skill in the art may make several improvements or polishing without departing from the principle of this disclosure and the improvements and polishing shall fall within the protection scope of this disclosure.

What is claimed is:

1. A transmission path selection method, applied to a terminal and comprising:
    obtaining configuration information for selecting a transmission path by the terminal, wherein a radio bearer of the terminal corresponds to at least two transmission paths; and
    selecting a transmission path from the at least two transmission paths based on the configuration information;
    wherein the configuration information comprises at least one of the following:
    a performance indicator based on which the terminal selects a transmission path; or
    a trigger event for selecting a transmission path by the terminal;
    wherein the performance indicator comprises at least one of the following:
    a packet loss rate;
    a delay; or
    a measurement result corresponding to a transmission path;
    wherein if the transmission path is associated with one cell, the measurement result corresponding to the transmission path is a measurement result of the cell associated with the transmission path; or
    if the transmission path is associated with a plurality of cells, the measurement result corresponding to the transmission path is a measurement result of a cell with a highest measurement value among the plurality of cells associated with the transmission path, or a measurement result of a cell with a lowest measurement value among the plurality of cells associated with the transmission path, or an average value of measurement results of all the cells associated with the transmission path, or an average value of measurement results of at least two cells whose measurement results are above or below a preset threshold among the plurality of cells associated with the transmission path.

2. The transmission path selection method according to claim 1, wherein the measurement result corresponding to a transmission path comprises at least one of the following:
    reference signal received power (RSRP);
    reference signal received quality (RSRQ);
    signal to interference plus noise ratio (SINR);
    signal to noise ratio (SNR);
    received signal strength indicator (RSSI);
    channel occupancy ratio (CR); or
    channel busy ratio (CBR).

3. The transmission path selection method according to claim 1, wherein the trigger event comprises at least one of the following:
    a trigger event for increasing the number of transmission paths;
    a trigger event for reducing the number of transmission paths; or
    a trigger event for changing a transmission path.

4. The transmission path selection method according to claim 3, wherein the trigger event for increasing the number of transmission paths comprises one of the following:
    that performance corresponding to a performance indicator of any transmission path currently in an active state is lower than a first preset threshold; or
    that performance corresponding to a performance indicator of n1 transmission paths among current m1 transmission paths in an active state is lower than a second preset threshold, wherein m1 and n1 are both positive integers, and n1 is greater than or equal to 2 and less than or equal to m1.

5. The transmission path selection method according to claim 4, wherein there are a plurality of first preset thresholds or second preset thresholds, different first preset thresholds are associated with different total numbers of active transmission paths, and different second preset thresholds are associated with different total numbers of active transmission paths.

6. The transmission path selection method according to claim 3, wherein the trigger event for reducing the number of transmission paths comprises one of the following:
that performance corresponding to a performance indicator of any transmission path currently in an active state is higher than a third preset threshold; or
that performance corresponding to a performance indicator of n2 transmission paths among current m2 transmission paths in an active state is higher than a fourth preset threshold, wherein m2 and n2 are both positive integers, and n2 is greater than or equal to 2 and less than or equal to m2.

7. The transmission path selection method according to claim 6, wherein there are a plurality of third preset thresholds or fourth preset thresholds, different third preset thresholds are associated with different total numbers of active transmission paths, and different fourth preset thresholds are associated with different total numbers of active transmission paths.

8. The transmission path selection method according to claim 3, wherein the trigger event for changing the transmission path comprises one of the following:
that performance corresponding to a performance indicator of a first target transmission path currently in an active state is lower than a fifth preset threshold; or
that performance corresponding to a performance indicator of a second target transmission path currently in an inactive state is higher than a sixth preset threshold; or
that performance corresponding to a performance indicator of a third target transmission path in an active state is lower than a seventh preset threshold, and that performance corresponding to a performance indicator of a fourth target transmission path in an inactive state is higher than an eighth preset threshold.

9. The transmission path selection method according to claim 3, wherein the selecting a transmission path from the at least two transmission paths based on the configuration information comprises:
after a condition of the trigger event is satisfied for a preset period of time, selecting the transmission path from the at least two transmission paths based on the configuration information.

10. An information configuration method, applied to a network device and comprising:
transmitting configuration information to a terminal, wherein the configuration information causes the terminal to select a transmission path from at least two transmission paths, and the at least two transmission paths are at least two transmission paths corresponding to a radio bearer of the terminal;
wherein the configuration information comprises at least one of the following:
a performance indicator based on which the terminal selects a transmission path; or
a trigger event for selecting a transmission path by the terminal;

wherein the performance indicator comprises at least one of the following:
a packet loss rate;
a delay; or
a measurement result corresponding to a transmission path;
wherein if the transmission path is associated with one cell, the measurement result corresponding to the transmission path is a measurement result of the cell associated with the transmission path; or
if the transmission path is associated with a plurality of cells, the measurement result corresponding to the transmission path is a measurement result of a cell with a highest measurement value among the plurality of cells associated with the transmission path, or a measurement result of a cell with a lowest measurement value among the plurality of cells associated with the transmission path, or an average value of measurement results of all the cells associated with the transmission path, or an average value of measurement results of at least two cells whose measurement results are above or below a preset threshold among the plurality of cells associated with the transmission path.

11. The information configuration method according to claim 10, wherein the measurement result corresponding to a transmission path comprises at least one of the following:
reference signal received power (RSRP);
reference signal received quality (RSRQ);
signal to interference plus noise ratio (SINR);
signal to noise ratio (SNR);
received signal strength indicator (RSSI);
channel occupancy ratio (CR); or
channel busy ratio (CBR).

12. The information configuration method according to claim 10, wherein the trigger event comprises at least one of the following:
a trigger event for increasing the number of transmission paths;
a trigger event for reducing the number of transmission paths; or
a trigger event for changing a transmission path.

13. A communications device, comprising a memory, a processor, and a program stored in the memory and capable of running on the processor, wherein when the program is executed by the processor, following steps are implemented:
obtaining configuration information for selecting a transmission path by the terminal, wherein a radio bearer of the terminal corresponds to at least two transmission paths; and
selecting a transmission path from the at least two transmission paths based on the configuration information;
wherein the configuration information comprises at least one of the following:
a performance indicator based on which the terminal selects a transmission path; or
a trigger event for selecting a transmission path by the terminal;
wherein the performance indicator comprises at least one of the following:
a packet loss rate;
a delay; or
a measurement result corresponding to a transmission path;
wherein if the transmission path is associated with one cell, the measurement result corresponding to the transmission path is a measurement result of the cell associated with the transmission path; or if the transmission path is associated with a plurality of cells, the measurement result corresponding to the transmission path is a measurement result of a cell with a highest measurement value among the plurality of cells associated with the transmission path, or a measurement result of a cell with a lowest measurement value among the plurality of cells associated with the transmission path, or an average value of measurement results of all the cells associated with the transmission path, or an average value of measurement results of at least two cells whose measurement results are above or below a preset threshold among the plurality of cells associated with the transmission path.

14. A communications device, comprising a memory, a processor, and a program stored in the memory and capable of running on the processor, wherein when the program is executed by the processor, the steps of the information configuration method according to claim 10 are implemented.

\* \* \* \* \*